United States Patent Office 3,028,230
Patented Apr. 3, 1962

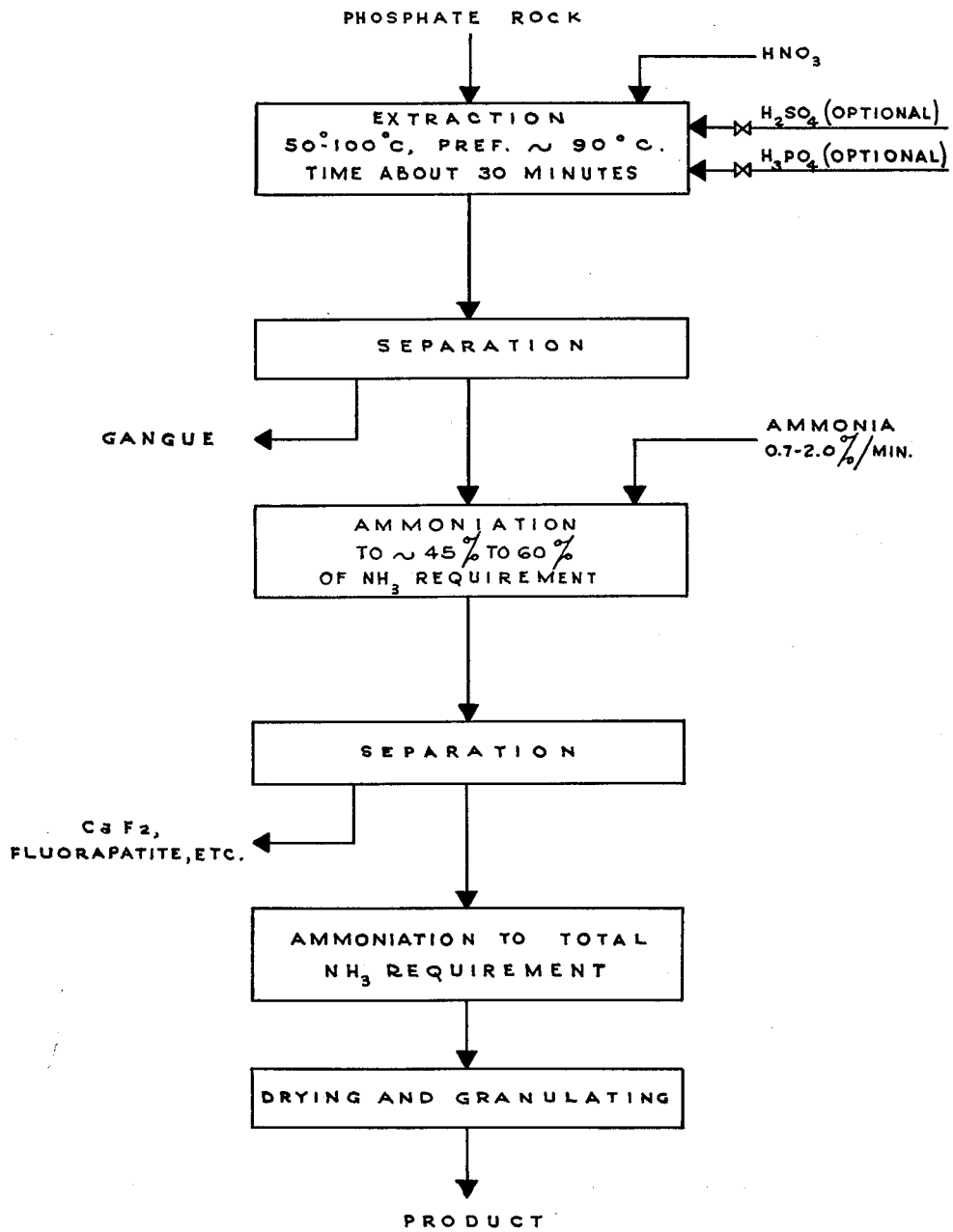

3,028,230
NITRIC PHOSPHATE PROCESS
John Clinton Brosheer, Florence, Ala., assignor to Tennessee Valley Authority, a corporation of the United States
Filed June 24, 1959, Ser. No. 822,699
1 Claim. (Cl. 71—37)
(Granted under Title 35, U.S. Code (1952), sec. 266)

The invention herein described may be manufactured and used by or for the Government for governmental purposes without payment to me of any royalty thereon.

This invention is an improved process for the manufacture of nitric phosphate fertilizer. A nitric phosphate fertilizer is the dried product of a slurry formed by extracting phosphate rock with nitric acid, a mixture of nitric and sulfuric acids, or a mixture of nitric and phosphoric acids, and ammoniating the extract produced. The phosphorus in the product is assumed to be present largely as dicalcium phosphate, but in many nitric phosphates much of the phosphorus is present as apatite, a compound which is much less valuable agronomically than dicalcium phosphate.

In such slurry-type processes practically all the phosphorus is in solution at the end of the extraction step, and the ammoniation of the extract is usually carried out in a continuous operation that comprises three or more stages. This invention relates to the slurry-type processes rather than to solid-type processes in which more concentrated acids are used and in which phosphorus is never all in solution at once.

In most domestic phosphate rock that is used in the manufacture of fertilizers, the mole ratio $CaO:P_2O_5$ ranges from about 3.3 to 4.0. This solution of the calcium phosphate constituents of the phosphate rock in nitric acid is extremely rapid and substantially complete. The extract, therefore, contains more calcium than is required to form dicalcium phosphate with all the phosphorus and is said to be unadjusted. An unadjusted extract yields a nitric phosphate that contains calcium nitrate and is quite hygroscopic.

It is conventional to avoid the disadvantage of hygroscopicity of product by adding phosphoric acid or sulfuric acid together with nitric acid used in the extraction step, and in such proportion that no soluble calcium salt remains when the extract is ammoniated to neutrality. Extracts made with use of such proportions of sulfuric or phosphoric acids are commonly called adjusted extracts.

Processes such as are described above are in commercial use, but they have the disadvantage of producing a product that contains a relatively high proportion of phosphate in the form of apatite. The term "apatite" in this specification is used to include those compounds which are more basic than dicalcium phosphate.

The ammonia requirement of an extract may be calculated by the following equations:

$(NH_3$—$N)$ requirement = $(NO_3$—$N) + 0.395(P_2O_5)$
$\quad + 0.747(F) - 0.500(CaO) - 0.550(Al_2O_3)$
$\quad\quad\quad\quad\quad\quad\quad - 0.351(Fe_2O_3)$ (1)

$(NH_3$—$N)$ requirement = $(NO_3$—$N) + 0.197(P_2O_5)$
$\quad + 0.368(F) - 0.250(CaO) - 0.274(Al_2O_3)$
$\quad\quad\quad\quad\quad\quad\quad - 0.175(Fe_2O_3)$ (2)

These equations give the ammonia requirements for unadjusted and adjusted extracts respectively.

For an unadjusted extract, the first equation is used; for an adjusted extract, the second equation is proper. In both equations the chemical formulas represent pounds of the components. Complete ammoniation is assumed to yield a precipitate comprising dicalcium phosphate, the normal phosphates of iron and aluminum, calcium fluoride, and a solution containing monoammonium phosphate and ammonium nitrate. With an unadjusted extract, calcium nitrate and ammonium nitrate, but no monoammonium phosphate, are present in solution. The term "ammonia requirement" is used in this specification and claim to mean the ammonia requirement calculated by the pertinent equation given above.

It is an object of this invention to provide a process for the manufacture of nitric phosphate fertilizer which greatly reduces the proportion of apatite present in the product.

Another object is to provide such process in which ammoniation of the nitric acid extract may be carried out rapidly without reversion of phosphate to unavailable form.

Still another object is to provide such process in which a large proportion of fluorine present in the nitric acid extract of phosphate rock is removed.

I have found that fluorine precipitated during an early stage of ammoniation of a nitric acid extract of phosphate rock has an unexpected catalytic property. This material catalyzes conversion to apatite of dicalcium phosphate precipitated in later stages of ammoniation of the extract. Based on this discovery, I have succeeded in producing nitric phosphates of very high phosphate availability by selective precipitation with partial ammoniation and filtration, and by continuing ammoniation after the fluorine is removed.

In the process of this invention, phosphate rock is extracted with nitric acid. Sulfuric acid or phosphoric acid, or a mixture of the two, may be added to the extraction step in quantity sufficient to result in an adjusted extract. The liquid extract may be separated from gangue and ammoniated with about 45 to 60 percent, usually about 50 percent, of the ammonia requirement calculated to the appropriate equation given above. At this stage of ammoniation a precipitate forms. This precipitate will contain approximately 90 percent of all fluorine extracted from the phosphate rock. The precipitate itself is a mixture of iron and aluminum phosphates, calcium fluoride, fluorapatite, and perhaps small proportions of other fluorine-containing compounds. The precipitate is then separated from the supernatant solution.

The solution is passed to a second ammoniation step, where it is ammoniated with the remainder of ammonia to fulfill the ammonia requirement. This second-step ammoniation can be conducted rapidly in one or more stages and without the slow addition and extreme care characteristic of other nitric phosphate processes at this point. Since the precipitate separated from the first ammoniation step is not present to exert a catalytic influence, there is substantially no formation of apatite during the second step of ammoniation. The phosphate in the product obtained after drying this ammoniated solution is substantially free from reverted phosphate. The drying step may be followed by or combined with a granulation step if desired.

The attached drawing is a flowsheet illustrating diagrammatically one process conducted according to the present invention. Therein it is shown that an extraction step is used for extracting phosphate rock with nitric acid. The addition of either sulfuric acid or phosphoric acid in this step is optional. Extraction is carried out at a temperature in the range from about 50° to 100° C., preferably about 90° C. A somewhat elevated temperature is preferred at this point to prevent precipitation of monocalcium phosphate. This extraction step normally is accompanied by considerable foaming. To reduce foaming troubles, I prefer to add the acid or acids to the phosphate rock at such rate that about 30 minutes is required for complete extraction. I prefer to use a tank or other suitable vessel equipped with an agitator as apparatus for this step and to maintain the phosphate rock-acid mixture in rapid agitation.

After the entire quantity of acid required has been added, the resulting mixture is a thin slurry containing a considerable portion of gangue suspended in an acid solution. This is passed to a suitable separation step. This separation of gangue may be omitted if desired.

Separation may be made by decantation, filtration, or any other type of separation step desired. The gangue is discarded, and the solution is passed to a first ammoniation step. In this first ammoniation step, ammonia is added to the solution in such quantity that about 45 to 60 percent of the total ammonia requirement is introduced. The rate of addition of ammonia is of some importance here. About 0.7 to 2 percent of the total ammonia requirement per minute is added. If one exceeds this rate of ammonia addition, the precipitate that forms during this step is difficult to filter. I have found that ammoniation at a rate of 3 percent of ammonia requirement per minute results in a precipitate that is very difficult to filter.

When ammoniation is complete to the extent of about 45 to 60 percent of total ammonia requirement, the material is passed to a second separation step and the precipitate formed is separated from solution. About 90 percent of the fluorine content of this precipitate is present as calcium fluoride. The other 10 percent is present as fluorapatite and other unidentified compounds. This precipitate may be washed to recover the small proportion of soluble fertilizer materials contained in it and the washings returned to the second ammoniation step. The washed precipitate may be treated for recovery of its fluorine content in the form of salable compounds by various means which will be apparent to those skilled in the art, such as the formation of hydrofluoric acid by treatment with sulfuric acid.

Solution from the second separation step is passed to a second ammoniation step and, in this step, the remainder of the total ammonia requirement is added. The ammonia may be added in as many stages as desired. The resulting pH of the material is usually in the range from about 3.5 to 4.0. The material is then dried and, preferably, is granulated during the drying step. The resulting product is substantially free from reverted phosphate and contains practically no apatite.

*Example I*

Florida pebble phosphate containing about 31.6 percent $P_2O_5$, 45.5 percent CaO, 1.4 percent $Al_2O_3$, 1.9 percent $Fe_2O_3$, 8.5 percent $SiO_2$, and 3.7 percent F was extracted with nitric acid. The extract was ammoniated at about 95° C. Several samples of the extract were treated according to slightly different procedures for comparison of the effects exerted on the products by various process variables. Ammoniation of these samples was conducted batchwise. The ammoniation was arbitrarily divided into stages by adding the percent of ammonia requirements shown in the following tables.

| Stage | Cumulative percent of— | | | | pH | Net mole ratio, $CaO:P_2O_5$ in cumulative second-stage and later precipitates |
| | $NH_3$ requirement | $P_2O_5$ precipitated | CaO precipitated | F precipitated | | |
|---|---|---|---|---|---|---|
| 1 | 45 | 20 | 17 | 91 | 0.5 | |
| 2 | 92 | 83 | 52 | 96 | 1.4 | 1.99 |
| 3 | 111 | 100 | 63 | 97 | 7.1 | 2.04 |

| Stage | Cumulative percent of— | | | | pH | Net mole ratio, $CaO:P_2O_5$ in cumulative second-stage and later precipitates |
| | $NH_3$ requirement | $P_2O_5$ precipitated | CaO precipitated | F precipitated | | |
|---|---|---|---|---|---|---|
| 1 | 43 | 18 | 16 | 92 | 0.5 | |
| 2 | 81 | 59 | 41 | 99 | 1.5 | 2.05 |
| 3 | 90 | 74 | 48 | 98 | 1.1 | 2.14 |
| 4 | 107 | 87 | 58 | 99 | 2.5 | 2.14 |
| 5 | 136 | 100 | 75 | 99 | 3.6 | 2.71 |
| 6 | 149 | 100 | 82 | 99 | 5.4 | 2.99 |
| 7 | 168 | 100 | 89 | 100 | 7.6 | 3.19 |

The results shown in the first table were obtained when the precipitate formed in the first stage indicated was removed before subsequent ammoniation. The second table is submitted for purposes of comparison. It lists the results obtained in otherwise identical procedures when the original precipitate first formed in the slurry was left in it during subsequent ammoniation. Comparison of these tables shows that when the precipitate formed during first-stage ammoniation at about 45 percent of the total ammonia requirement was removed, all $P_2O_5$ was precipitated by ammoniation to 111 percent of the ammonia requirement; but only 63 percent of calcium oxide was so precipitated. Ninety-one percent of the fluorine contained in the original extract was removed in the precipitate formed during the first step of ammoniation. The highest mole ratio of $CaO:P_2O_5$ obtained after ammoniation to 111 percent of the total ammonia requirement was only 2.04. When the first-stage precipitate was left in the slurry during subsequent ammoniation to exert its catalytic effect on the formation of apatite during the remainder of ammonia addition, the $CaO:P_2O_5$ mole ratio was 2.14 at 107 percent of the ammonia requirement and the mole ratio increased up to 3.19 during subsequent addition of ammonia, thus showing the formation of materials more basic than dicalcium phosphate in the slurry as ammoniation proceeded in the presence of the precipitated fluorine.

Experiments of similar nature was repeated many times, using Florida pebble, Tennessee brown, Florida hard, Ocean Island, and western phosphate rock. The beneficial results in reducing formation of apatite and other materials more basic than dicalcium phosphate on removal of the precipitate first formed were found to occur with all types of rock used. It was also found that when an extract of phosphate rock is ammoniated to completion, without removal of the precipitate first formed, the precipitate at any degree of ammoniation is very finely divided and settles slowly from mother liquor. When the precipitate that first forms and contains about 90 percent of the fluorine content of the extract is removed, however, subsequent precipitates are granular and settle rapidly.

*Example II*

A low-fluorine filtrate having a weight ratio of $F:P_2O_5$ of 0.011 that had been overadjusted with phosphoric acid to a net mole ratio of $CaO:P_2O_5$ of 1.8 was ammoniated completely in a single continuous stage with precipitation of all the calcium and formation of only dicalcium phosphate when the total ammonia requirement was added. The terminal pH was 4.0. Addition of more than the ammonia requirement in either one or two continuous stages also precipitated all the calcium, but the precipitate contained less phosphorus and significant fractions of the phosphorus in the precipitate were present in the form of calcium phosphate compounds more basic than dicalcium phosphate. Similar results were obtained with an adjusted filtrate in which the net mole ratio $CaO:P_2O_5$ was 2.03 and the weight ratio $F:P_2O_5$ was 0.015.

I claim, as my invention:

In a process for the manufacture of a nitric phosphate fertilizer low in apatite content, in which process phosphate rock is extracted with a material selected from the group consisting of nitric acid, a mixture of nitric and sulfuric acids, and a mixture of nitric and phosphoric acids, thereafter preneutralizing the resulting extract by partial ammoniation thereof, thereafter removing by filtration the resulting precipitate, and thereafter further ammoniating the remaining extract to precipitate therefrom the desired product, the improvement in substantially preventing conversion of dicalcium phosphate to apatite, which improvement consists of the steps of: carrying out the preneutralization step by adding about 45 to 60 percent of the total ammonia requirement to the extract to be neutralized, at a rate of about 0.7 percent to 2.0 percent per minute of said extract's total requirement; removing in the filtration step a precipitate containing more than 90 percent of the fluorine originally present in the phosphate rock extract; and carrying out the further ammoniation step by adding additional ammonia to the remaining extract in quantity sufficient to raise its pH to about 3.5 to 4.0.

References Cited in the file of this patent

UNITED STATES PATENTS

| | | |
|---|---|---|
| 2,555,656 | Plusje et al. | June 5, 1951 |
| 2,803,531 | Swenson et al. | Aug. 20, 1957 |
| 2,861,878 | Bigot | Nov. 25, 1958 |